United States Patent [19]
Hildemann

[11] 3,885,858
[45] May 27, 1975

[54] TELESCOPE MOUNTING

[76] Inventor: Victor R. Hildemann, 1647 Minnesota St., Oshkosh, Wis. 54901

[22] Filed: Nov. 14, 1973

[21] Appl. No.: 415,909

[52] U.S. Cl. ................................. 350/83; 350/85
[51] Int. Cl. ............................................ G02b 23/16
[58] Field of Search ............ 350/83, 84, 85, 80, 82; 343/765

[56] References Cited
UNITED STATES PATENTS

| | | | |
|---|---|---|---|
| 836,771 | 11/1906 | Lohmann | 350/83 |
| 2,711,589 | 6/1955 | Stock | 350/83 |
| 3,606,520 | 9/1971 | Rockwell | 350/83 |
| 3,751,134 | 8/1973 | McMahon | 350/83 |

FOREIGN PATENTS OR APPLICATIONS

| | | | |
|---|---|---|---|
| 994,150 | 6/1965 | United Kingdom | 350/83 |

*Primary Examiner*—Eli Lieberman
*Attorney, Agent, or Firm*—Joseph P. House, Jr.

[57] ABSTRACT

A Newtonian type telescope tube is mounted for rotation about a polar axis, a vertical axis, and a horizontal axis. The telescope eyepiece tube is large enough and strong enough to support the telescope tube and is located on or near the horizontal axis to reduce movement of the eyepiece when the telescope tube is rotated about its horizontal or vertical axis.

8 Claims, 6 Drawing Figures

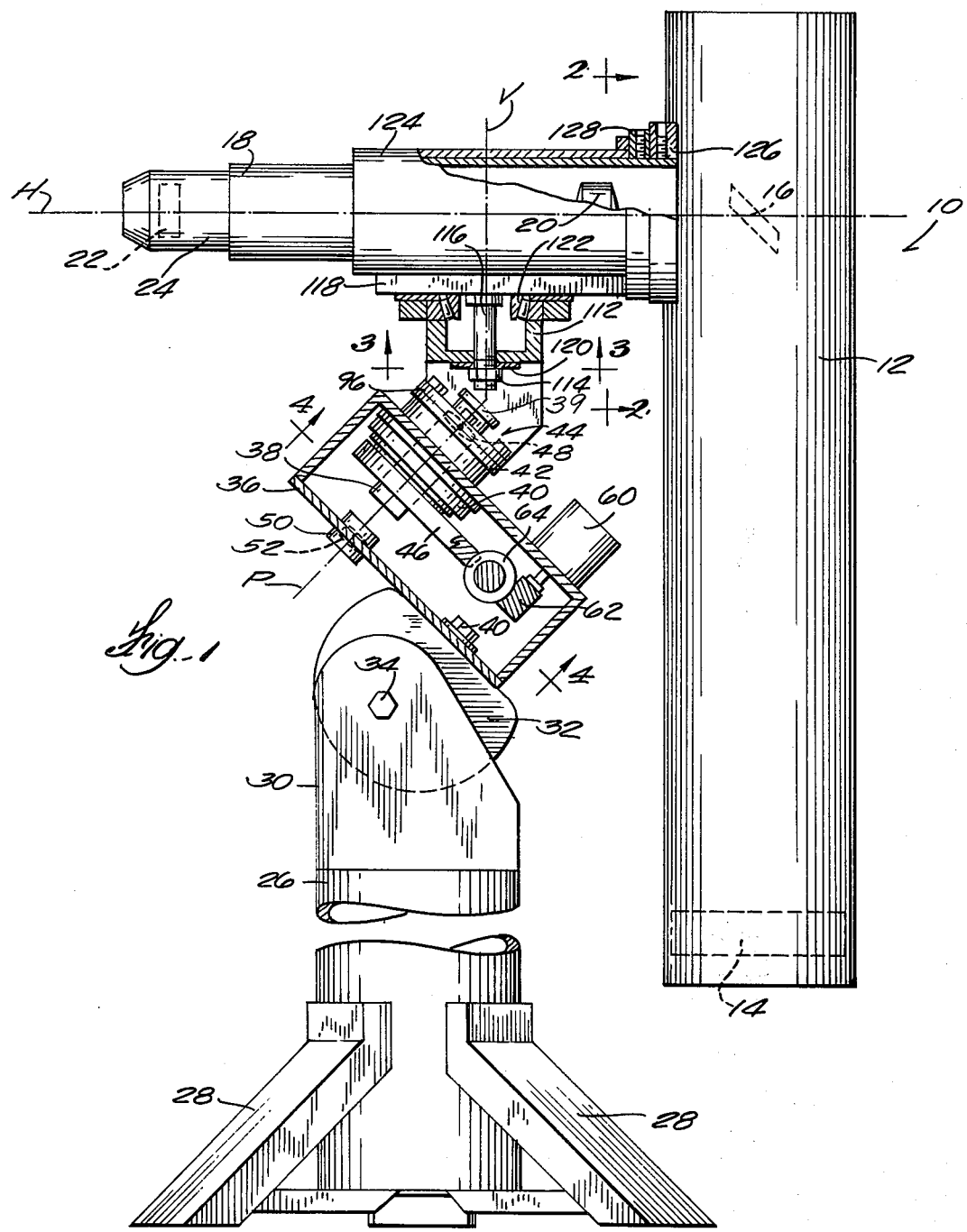

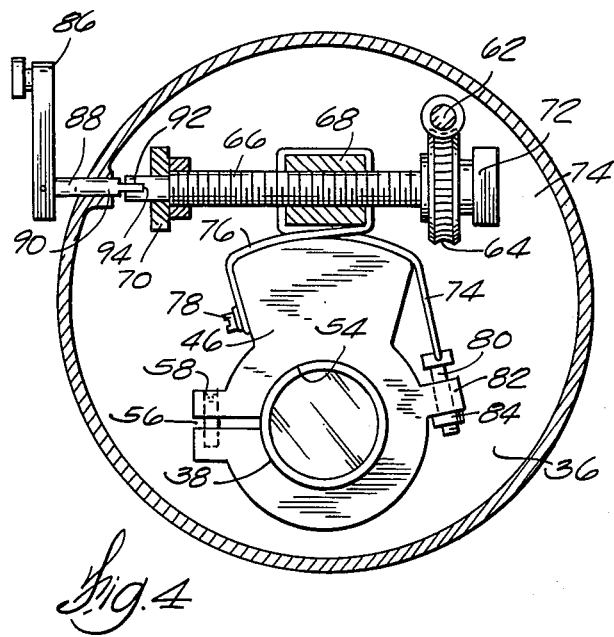
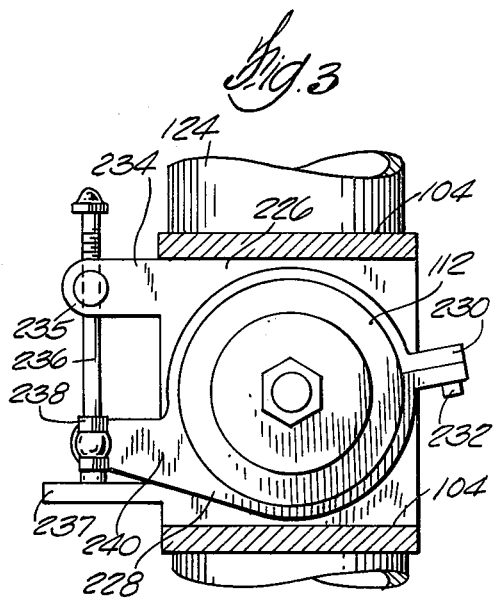
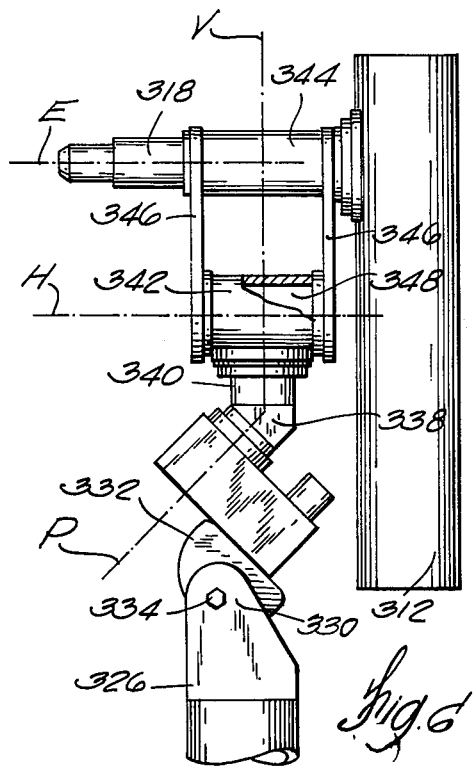
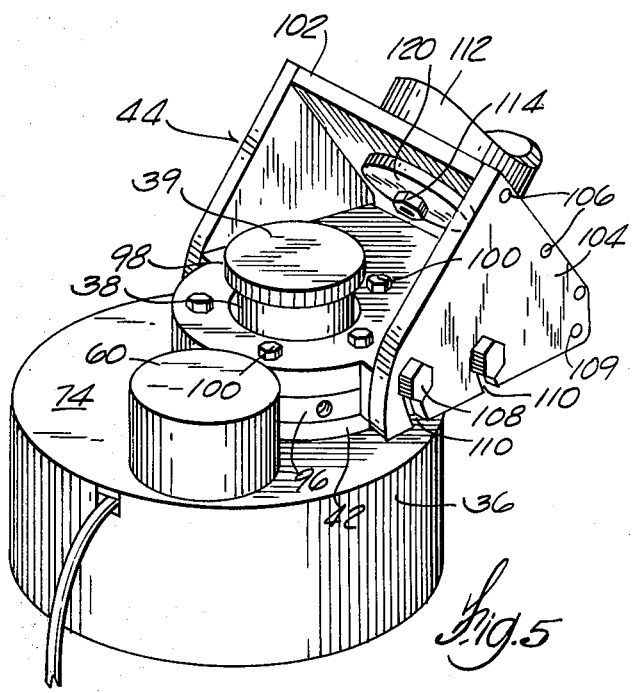

TELESCOPE MOUNTING

BACKGROUND OF THE INVENTION

The most common telescope mounting is the equatorial mount in which the telescope tube is mounted for rotation about a polar axis which is parallel with the celestial polar axis and for rotation about a declination axis which is perpendicular to the polar axis. Such mountings commonly include a motor for rotating the telescope about its polar axis at the rate of one revolution per day to automatically track the observed celestial object as it rotates about the celestial polar axis, the latter rotation being the visible effect of the earth's rotation about its axis. As the telescope tube is rotated to aligh it with a star, the eyepiece moves with the telescope tube, thereby requiring the observer to continually shift his position. This is inconvenient and is a source of discomfort. The eyepiece also moves with the telecope tube when it is rotated about its declination axis to move the field of view from one celestial object to another, and in some positions of the telescope tube, the eyepiece is in a position which requires the viewer to adopt an uncomfortable position in order to look through the eyepiece.

Accordingly, the principal object of this invention is to provide an improved telescope mounting in which the eyepiece is positioned for comfortable viewing in all positions of the telescope mounting.

Other objects and advantages of the invention will be apparent to those skilled in the art from the description which follows.

SUMMARY OF THE INVENTION

In accordance with this invention, the above noted object is achieved by providing a telescope mounting in which a Newtonian telescope tube is mounted for roation about a polar axis, a vertical axis, and a horizontal axis, the eyepiece tube being strong enough to support the telescope tube and being located on or near the horizontal axis to place the eyepiece in a comfortable viewing position and to reduce movement of the eyepiece when the telescope tube is moved about its vertical or horizontal axis.

DESCRIPTION OF THE DRAWINGS

FIG. 1 is a fragmentary side elevation of one illustrative embodiment of the invention, portions of the telescope and mounting being cut away and shown in cross section to expose inner details.

FIG. 2 is a fragmentary cross-sectional view taken on the line 2—2 of FIG. 1.

FIG. 3 is a fragmentary cross-sectional view taken on the line 3—3 of FIG. 1.

FIG. 4 is a fragmentary cross-sectional view taken on the line 4—4 of FIG. 1.

FIG. 5 is an enlarged perspecitve view of the angle bracket shown in FIG. 1.

FIG. 6 is a fragmentary side of a second embodiment of the invention.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 shows a modified Newtonian type reflecting telescope 10 mounted for rotation about a polar axis P, a vertical axis V, and a horizontal axis H. The telescope 10 includes a telescope tube 12 which supports a conventional concave mirror 14 and a conventional plane mirror 16. Concave mirror 14 picks up light from the telescope's field of view and reflects it to plane mirror 16, which in turn reflects the light into an eyepiece tube 18 which is attached to one side of telescope tube 12 and projects at right angles to the axis thereof. Eyepiece tube 18 supports a conventional image erector lens 20 and a conventional eyepiece lens 22, which is mounted within an eyepiece draw tube 24. Eyepiece tube 18 is unconventional in that it supports the telescope tube 12 and defines a horizontal axis about which the telescope tube 12 can be rotated. In the past, such Newtonian telescope eyepiece tubes have only served to support the eyepiece lenses.

In order to perform the novel function of supporting telescope tube 12, eyepiece tube 18 is made relatively large in its dimensions compared to prior art eyepiece tubes and is made of relatively strong material such as steel to provide good support for the telescope tube 12.

The mounting means for telescope tube 12 includes a central column or pillar 26 which is supported by three legs 28, two of which are visible in FIG. 1. A yoke 30 is mounted on top of pillar 26 and a knuckle block 32 is pivotally secured within yoke 30 by means of a bolt 34. A polar axis drive housing 36 is rigidly attached to knuckle block 32 by conventional means including a bolt 40. When the knuckle block 32 is rocked about the axis of bolt 34, it causes the polar axis P to swing upwardly and downwardly. The azimuth angle of polar axis P can be adjusted by turning the pillar 26.

A polar axis tube 38 is journalled within polar axis housing 36 by roller bearings 40 and 42, which are attached to polar axis housing 36 by conventional means. Tube 38 is a structural member which is attached at its upper end to an angle bracket 44, which is described hereinafter, and is attached near its lower end to a polar axis drive block 46. The polar axis tube 38 also serves as an optical tube for aligning the polar axis P with Polaris. For this reason, a lens 48 is mounted in the upper end of polar axis tube 38, and a coaxial tube 50 supporting a lens 52 is attached to the bottom of housing 36. Conventional cross hairs (not shown) are mounted within the tubes 38 and 50 for the purpose of accurately aligning polar axis P with Polaris in accordance with well known prior art techniques. A dust cap 39 is fitted over the upper end of polar axis tube 38.

The polar axis drive block 46 has a central circular opening 54 (see FIG. 4) and is slotted at 56 so that the diameter of opening 54 may be adjusted by a setscrew 58 to securely clamp block 46 to polar axis tube 38. The polar axis drive block 46 is used to rotate the telescope tube 12 around its polar axis at a rate of one revolution per day in combination with drive means which includes an electric motor 60 (see FIGS. 1 and 5), a worm gear 62 which is driven by motor 60, a pinion gear 64 which engages worm gear 62, a lead screw 66 which is attached to pinion gear 64 and is rotated thereby, and a drive nut 68 which engages the lead screw 66 and is driven thereby. The lead screw 66 is journalled to polar axis housing 36 via openings in two ears 70 and 72 which project downwardly from the upper surface 74 of polar axis drive housing 36.

A taut, relatively flexible steel cable 76 (see FIG. 4) is attached at its two ends to the polar axis drive block 46 and is looped around the drive nut 68 to be driven thereby. Cable 76 is attached in a fixed position at one end to polar axis drive block 46 by a machine screw 78. The other end of steel cable 76 is attached to a bolt 80 which passes through an ear 82 of block 46 and is secured thereto by a nut 84. The axis of bolt 80 is aligned with the corresponding end of cable 76 so that adjustment of the nut 84 will vary the tension in cable 76, which is drawn taut enough to eliminate lost motion and play. As the lead screw 66 is rotated by gears 62 and 64, it causes a linear movement of nut 68 which is translated into a rotary motion of polar axis tube 38 via the taut, flexible steel cable 76. This rotates the telescope tube 12 about its polar axis P to compensate for the earth's rotary motion about its axis.

Lead screw 66 can also be rotated manually in either direction by a hand crank 86 whose shaft 88 extends inwardly through an opening 90 of polar axis housing 36. The end 92 of shaft 88 is shaped to engage a slot 94 in the end of lead screw 66. Hand crank 86 can be removed from opening 90 and can then be re-inserted when it is desired to turn lead screw 66 manually.

The above described polar axis drive mechanism is geared to turn polar axis tube 38 at a rate of 1 revelation per day to counteract the rotation of the stars about the celestial polar axis. However, the drive mechanism is only capable of turning polar axis tube 38 through approximately 30°, which means that the drive nut 68 has to be reset manually by hand crank 86 every two hours to prevent nut 68 from abutting against one of the mounting ears 70, 72. After the drive nut 68 is reset, it is necessary to re-align the telescope tube 12 with the celestial object which is being observed. The object will then stay aligned for another two hour period due to the rotation of the polar axis drive mechanism.

Referring to FIGS. 1 and 5, the polar axis tube 38 is rigidly attached to a collar 96 by conventional means, e.g. by welding collar 96 to tube 38 or by fastening collar 96 to tube 38 with machine screws. Collar 96 is rigidly attached to the bottom plate 98 of angle bracket 44 by machine screws 100. This establishes a rigid connection between angle bracket 44 and polar axis tube 38 so that the entire bracket 44 will rotate with polar axis tube 38. In addition to bottom plate 98, the angle bracket 44 also includes a top plate 102 and two side plates 104 which are attached to top plate 102 by screws 106 and are attached to bottom plate 98 by bolts 108 and corner screws 109. The bolts 108 fit in curved slots 110 which permit the angle between bottom plate 98 and top plate 102 to be changed to permit the horizontal axis H and vertical axis V to be adjusted for different latitudes. This adjustment is necessary becuase the angle between polar axis P and horizontal axis H varies with latitude.

The top plate 102 of angle bracket 44 has a vertical tube 112 attached thereto by means of a nut 114, which engages the threaded end of a stud 116, which projects downwardly from a bracket 118. Bearings 120 are mounted between the lower end of vertical tube 112 and top plate 102 of bracket 44. Bearings 122 are mounted between the top of vertical tube 112 and the bracket 118. Bearings 120 and 122 permit vertical tube 112 to be rotated about the axis V to define the vertical axis for the telescope. The bracket 118 is rigidly attached to a horizontal tube 124 which slideably receives the eyepiece tube 18 and defines the horizontal axis H for the telescope.

Although the above described components are sufficient to make an operable telescope, it is desirable to add fine adjustment means for the horizontal and vertical axes to expedite centering the observed celestial object in the telescope's field of view. One such fine adjustment means, shown in FIGS. 1 and 2, comprises a stationary clamp 126, which is rigidly attached to the telescope tube 12 at its junction with eyepiece tube 18, and a movable clamp 128 which is split at 130 and loosely clamped to horizontal tube 124 by a machine screw 132. A projecting ear 134 on clamp 126 is threaded at 135 to receive an adjustment screw 136, which also passes through a threaded opening 138 in an ear 140 on clamp 128. Adjustment screw 136 has a knob 137 on one end which is shaped to be grasped between the user's thumb and fingers. Clamp 128 is shown drawn tight enough by machine screw 132 to be able to rotate telescope tube 12 about horizontal axis H when adjustment screw 136 is turned. However, clamp 128 is loose enough so that telescope tube 12 can also be rotated manually about the horizontal axis H. In practice, the telescope tube 12 is first rotated manually to place the desired celestial object in the telescope's field of view, and then the fine adjustment screw 136 is turned until the celestial object is centered in the field of view.

A second fine adjustment means is mounted on the portion of the telescope mount which forms the vertical axis V. This fine adjustment means is shown in FIGS. 3 and 3 and is the same as the fine adjustment means described above. To identify the corresponding parts shown in FIGS. 2 and 3, the same two digit number is used for a given part in both figures with a different hundred digit being used in different figures; e.g. clamp 126 in FIG. 2 is the same as clamp 226 in FIG. 3, adjustment screw 136 in FIG. 2 is the same as adjustment screw 236 in Fig. 3, and so on.

Although the eyepiece tube 18 in the above described embodiment is coaxial with the horizontal adjustment axis H, it is possible in other embodiments to displace the eyepiece tube a short distance from the horizontal adjustment axis to better balance the telescope tube 12. Such a mounting is shown in Fig. 6. In this embodiment, a telescope tube 312 having a transversely projecting eyepiece tube 318 is supported by a mounting which includes a pillar 326 having a yoke 330 on its upper end, a knuckle block 332 pivoted within yoke 330 by a bolt 334, a polar axis housing 336 rigidly attached to knuckle block 332 and pivotable therewith, an angle bracket 338 journalled to the top of polar axis housing 336, a vertical tube 340 journalled to angle bracket 338, and a horizontal axis tube 342 journalled to the top of vertical axis tube 340. The parts enumerated thus far are identical with the corresponding parts for the previously described embodiment. However, this embodiment differs from the previously described embodiment in that the axis E of eyepiece tube 318 is displaced from horizontal axis H by a distance of approximately 4½ inches, which is great enough to provide better balancing for telescope tube 312 without being so great as to cause excessive movement of the eyepiece tube 318 when the telescope is rotated about the horizontal axis H.

The eyepiece tube 318 is rigidly attached within an adapter tube 344 which is coupled by adapter arms 346 to a support tube 348 which is rotatable within horizontal axis tube 342. thereof,

I claim:

1. In a telescope assembly including a telescope tube with an eyepiece and means for rotatably supporting the telescope tube for rotation about a polar axis, the improvement comprising means for rotatably supporting the telescope tube for rotation about a vertical axis, and means for rotatably supporting the telescope tube for rotation about a horizontal axis, said telescope tube having an eyepiece tube projecting laterally from one side threrof, said eyepiece tube being strong enough to support said telescope tube, and wherein said means for supporting the telescope tube for rotation about a horizontal axis comprises a horizontal tube which is dimensioned to rotatably embrace said eyepiece tube, said horizontal tube being supported by said means for supporting the telescope tube for rotation about a vertical axis.

2. In a telescope assembly including a telescope tube with an eyepiece and means for rotatably supporting the telescope tube for rotation about a polar axis, the improvement comprising means for rotatably supporting the telescope tube for rotation about a vertical axis, and means for rotatably supporting the telescope tube for rotation about a horizontal axis, said telescope tube having an eyepiece tube projecting laterally from one side thereof, said eyepiece tube being strong enough to support said telescope tube, and means for supporting said eyepiece tube with its axis substantially parallel to said horizontal axis.

3. The improvement defined in claim 2 wherein said eyepiece tube is relatively close to said horizontal axis to prevent excessive movement of said eyepiece tube when said telescope tube is rotated about its vertical or horizontal axis.

4. A telescope mount for movably supporting a telescope tube for rotation about a polar axis, a vertical axis, and a horizontal axis, said telescope mount comprising a base assembly, a polar axis tube rotatably mounted on said base assembly to effect movement of said telescope tube about a polar axis, a vertical axis tube rotatably mounted on said polar axis tube to effect movement of said telescope tube about a vertical axis, a horizontal axis tube rotatably mounted on said vertical axis tube to effect movement of said telescope tube about a horizontal axis, and means coupling said telescope tube to said horizontal axis tube to movably support the telescope tube, said telescope tube having an eyepiece tube projecting laterally from one side thereof, said eyepiece tube being strong enough to support said telescope tube, and wherein said eyepiece tube is dimensioned to rotatably fit within said horizontal axis tube.

5. A telescope mount as defined in claim 4 and further comprising an angle bracket rigidly attached to the top of said polar axis tube, and means for rotatably connecting said vertical axis tube to the top of said angle bracket.

6. A telescope mount for movably supporting a telescope tube for rotation about a polar axis, a vertical axis, and horizontal axis, said telescope mount comprising a base assembly, a polar axis tube rotatably mounted on said base assembly to effect movement of said telescope tube about a polar axis, a vertical axis tube rotatably mounted on said polar axis tube to effect movement of said telescope tube about a vertical axis, a horizontal axis tube rotatably mounted on said vertical axis tube to effect movement of said telescope tube about a horizontal axis, and means coupling said telescope tube to said horizontal axis tube to movably support the telescope tube, said telescope tube having an eyepiece tube projecting laterally fron one side thereof, said eyepiece tube being strong enough to support said telescope tube, and means for coupling said eyepiece tube to said horizontal axis tube, said eyepiece tube being located in the neighborhood of said horizontal axis tube to reduce movement of the eyepiece tube when the telescope tube is rotated about its vertical or horizontal axis.

7. A telescope mount as defined in claim 5 and further comprising means for adjusting the angle of said angle bracket.

8. A telescope mount for movably supporting a telescope tube for rotating about a polar axis, a vertical axis, and a horizontal axis, said telescope mount comprising a base assembly, a polar axis tube rotatably mounted on said base assembly to effect movement of said telescope tube about a polar axis, a vertical axis tube rotatably mounted on said polar axis tube to effect movement of said telescope tube about a vertical axis, a horizontal axis tube rotatably mounted on said vertical axis tube to effect movement of said telescope tube about a horizontal axis, means coupling said telescope tube to said horizontal axis tube to movably support the telescope tube, an electric motor coupled to said polar axis tube for rotating the same, the means coupling said motor to said polar axis tube including a lead screw, means connecting said motor to said lead screw to rotate the same, a nut engaged on said lead screw and movable therealong, and at least one relatively flexible band coupled tautly between said nut and said polar axis tube to cause rotary movement of said polar axis tube in response to linear movement of said nut along said lead screw.

* * * * *